United States Patent [19]

Zackay et al.

[11] Patent Number: 4,459,269

[45] Date of Patent: Jul. 10, 1984

[54] METHOD FOR REMOVING OZONE FROM DILUTE CONCENTRATIONS IN AIR AT ROOM TEMPERATURES

[75] Inventors: Victor F. Zackay, New Canaan, Conn.; Donald R. Rowe, Bowling Green, Ky.

[73] Assignee: Teledyne Industries, Inc., Fort Collins, Colo.

[21] Appl. No.: 508,856

[22] Filed: Jun. 29, 1983

[51] Int. Cl.$^3$ .............................................. C01B 13/00
[52] U.S. Cl. ..................................................... 423/219
[58] Field of Search ......................................... 423/219

[56] References Cited

U.S. PATENT DOCUMENTS 2,582,885  1/1952  Rosenblatt ...................... 423/219
4,173,549  11/1979  Kent ................................. 423/219
4,261,863  4/1981  Kent ................................. 423/219

Primary Examiner—Peter D. Rosenberg
Attorney, Agent, or Firm—Ralph F. Crandell

[57] ABSTRACT

Ozone is catalytically removed from air at room temperatures. Air containing ozone in dilute concentrations is contacted with a catalyst formed of a; palladium (II) salt such as palladium (II) chloride, a copper (II) slat such as copper (II) chloride and copper (II) sulfate, and a nickel (II) salt such as nickel (II) chloride, on an alumina substrate, at a temperature in the range of $-20°$ C. to $85°$ C. The catalyst is formed by making a paste of particulate alumina and a palladium (II) halide containing impregnating solution and then drying the paste and activating the catalyst by heating.

11 Claims, No Drawings

METHOD FOR REMOVING OZONE FROM DILUTE CONCENTRATIONS IN AIR AT ROOM TEMPERATURES

BACKGROUND OF THE INVENTION

1. Field of the Invention

The present invention relates to an improved method for reducing gaseous pollutants present in highly dilute concentrations in air at ambient room temperatures. More specifically, the present invention relates to the removal of ozone from ambient air.

2. Description of the Prior Art

It is known that carbon monoxide can be oxidized to carbon dioxide and that sulfur dioxide can be oxidized to sulfur trioxide by contact, in dilute concentrations in air, with an oxidation catalyst containing palladium (II) and copper (II) halide salts in a solution or on a substrate or support such as alumina. Such catalysts are described in considerable detail in U.S. Pat. No. 3,790,662, issued Feb. 5, 1974, to Larox Research Corporation for "Palladium Compositions Suitable As Oxidation Catalysts," in U.S. Pat. No. 3,849,336, issued Nov. 19, 1974, to Larox Research Corporation for "Palladium Compositions Suitable As Oxidation Catalyst," and in copending application of Victor F. Zackay and Donald R. Rowe, Ser. No. 504,517 filed June 15, 1983 for "Improved Palladium Catalyst." The disclosures of these patents and application are incorporated herein and made a part of this specification by this reference.

One source of air pollution is ozone.

OBJECTS AND SUMMARY OF THE INVENTION

It is the principal object of the present invention to provide an improved catalytic method for removing ozone in dilute concentrations in air.

A more specific object is to provide an improved catalyst capable of oxidizing highly dilute concentrations of ozone in air.

In accordance with the foregoing objects and as described below in further detail, the present invention contemplates a method and composition for removing ozone from highly dilute concentrations thereof in air. The method comprises contacting the ozone and air mixture with a catalyst comprising a palladium (II) or palladic salt and a copper (II) or cupric salt, the salts preferably being the halides such as palladic halide and cupric halide. The salts are carried on a solid support, such as alumina particles or alumina substrate which has been mixed to a paste with a solution of the salts, dried, and thereafter activated by heating. It has further been observed that an optimum concentration of approximately 0.080 gram-moles palladium per liter of impregnating solution, or 0.03 gram-atoms palladium per kilogram of alumina is highly effective for the purposes of this invention. It is expected that the concentration of gases in the air will be highly dilute and the method of this invention is effective at room or ambient temperatures ranging from approximately −20° C. to about 50° C.

The catalytic composition is prepared as described in U.S. Pat. Nos. 3,790,662, and 3,849,336, and copending application Ser. No. 504,517.

DESCRIPTION OF THE PREFERRED EMBODIMENT

Highly dilute concentrations of ozone in air can be removed, at ambient room temperatures, by contact with solid palladium containing catalysts. Catalysts for use in connection with the present invention are prepared as described in U.S. Pat. No. 3,790,662, U.S. Pat. No. 3,849,336, and application Ser. No. 504,517, by dissolving palladium (II) chloride, copper (II) chloride, and nickel (II) chloride if desired, in water at about 20° to 25° C. The amount of palladium (II) chloride may run from about 0.0005 gram-moles per liter of palladium (II) chloride up to the solubility of the salt, with an observed optimum of about 0.080 gram-moles per liter palladium (II) chloride in the impregnating solution. While the amount of palladium (II) salt may be reduced from the optimum of 0.080 gram-moles per liter of solution, the activity or reaction rate constant "k" also drops. The activity constant may however be retained at a higher level, or prevented from dropping as fast, by the addition of nickel (II) chloride to maintain the total concentration of palladium and nickel at 0.080 gram-moles per liter of solution, as described in application Ser. No. 504,517. The effect of reduced palladium levels on catalytic activity is mitigated by the addition of nickel salts, and has been observed actually to synergistically increase the reaction rate constant of the catalyst composition.

One illustrative catalyst composition comprises an alumina base supporting a catalytic palladium (II) salt composition. The catalyst is prepared by forming a paste of activated alumina with an aqueous solution containing palladium (II) chloride, copper (II) chloride, and copper (II) sulfate. The alumina paste is air dried for at least 24 hours and is then activated by oven treatment for about 2 hours at about 200° C. The catalyst contains about 0.03 gram-atoms palladium (II) per kilogram of alumina.

Instead of adding an excess of aqueous impregnating solution, and then later filtering off the raffinate and recovering chemical values or reconstituting it for future batches, it is possible simply to add just enough aqueous impregnating solution to make a semi-moist paste with the alumina (typically about 30 cc of aqueous solution to 50 g of a fine mesh alumina). The wet impregnated alumina is spread on porcelain dishes and allowed to air-dry. After the first few hours it is advantageous to stir the drying alumina and break up any clusters. When the alumina is completely air-dried, the porcelain dishes are heated to activate the catalyst. The finished, activated, catalyst is then allowed to cool, and can then be stored or put to use.

Generally, "paste" catalysts formed in this manner have not been found to be as active for CO, $H_2S$ and HCN oxidation as the corresponding soak catalysts. They have surprisingly, however, been found to be highly effective in reducing ozone concentrations in air.

Ozone is conveniently generated in the laboratory by passing air (or other oxygen containing gas) through a high voltage discharge of sufficient energy to produce atomic oxygen. The only stable products formed under these conditions are $O_2$ (normal diatomic oxygen) and $O_3$ (ozone). Nominally, a third product, nitrous oxide, $N_2O$, might also be expected; actually, molecular nitrogen is an extremely stable species, not detectably oxidized under these conditions.

The small laboratory ozone generator utilized in the following examples generates an air stream containing ozone at typically 5–20 ng/cc (4–16 ppm), much higher concentrations than normally encountered, and well above the threshold level of irritation to humans.

We have observed that ozone is substantially eliminated when an ozone-containing airstream is passed over a catalyst of the type described in U.S. Pat. Nos. 3,790,662 and 3,849,336 and application Ser. No. 504,517. When using "soak" type catalysts, wherein an excess of impregnating solution is used, with a contact time of about a third of a second with the $O_3$, complete elimination of the ozone was observed for the first few minutes of the run. After only about 20 minutes however, only 84% of the ozone was removed, after 40 minutes 34%, and after 60 minutes only 20% of the $O_3$ was removed.

Upon the use of "paste" type catalysts it was observed that such catalysts were highly effective, removing better than 99.5% after 60 minutes' continual run. It has also been found that the alumina support by itself has little initial activity, negligible in comparison with that of an active catalyst. These results are summarized in Table 1. The data in Table 1 indicates that catalysts using the "paste" preparation as described above, are more effective with ozone than the more common "soak" catalysts. A "paste" catalyst, was prepared, using activated Fisher neutral alumina, as described above.

A sample of a coarser, less pure and less costly Alcoa grade F1 alumina (14/28 mesh) was activated in the usual way and batches of catalyst were prepared using both the "soak" technique and the "paste" technique. Four runs were then made, with contact times all close to 0.3 second and ozone concentrations in the range 14–27 ng/cc. Each run was carried out for two hours without interruption, with effluent air samples analyzed periodically during each run. The results of these runs are summarized in Table 2.

The ranking of these four catalysts depends somewhat upon the time after commencement of the run, but some key generalizations are independent of testing time. The most important of these is that the two "paste" catalysts appear to be markedly better than the corresponding "soak" catalysts, whether the data comparison is made at 30, 60, 90 or 120 minutes. Second, Fisher 80/200 mesh alumina appears to be more effective than Alcoa 14/28 mesh alumina when the corresponding catalysts are compared; e.g., Fisher "paste" with Alcoa "paste." Third, at least in the comparison of these two aluminas, the manner of preparing the catalyst is more important than the alumina source Alcoa "paste" is a better catalyst for ozone removal than Fisher "soak" (though not by a wide margin).

At the end of 30 minutes, the two paste catalysts were essentially perfect, each removing over 99% of the ozone, while the conversions for the two soak catalysts had fallen to 64–76%. At the end of 60 minutes the Alcoa paste catalyst had "broken", and was removing only about three quarter of the ozone, while the soak catalysts were removing about half of the ozone. At the end of two hours the Fisher paste catalyst was still reducing effluent ozone to immeasurably low levels, the Alcoa paste was removing a little more than half of the ozone, and the two soak catalysts were removing somewhat less than half of the ozone.

TABLE 1
The Catalytic Removal of Ozone

| Run | Catalyst charge | | Contact time millisec | Initial concn micrograms/lit | Final concn micrograms/lit | Percent Ozone Removed | Pseudo-1st order k |
|---|---|---|---|---|---|---|---|
| 1 | "Paste" | 4.00 g | 406 | 16.75 | 0.05 ± 0.06 | 99.5 | 15. |
| 2 | "Paste" | 4.00 | 390 | 19.42 | 0.02 ± 0.00 | 99.5 | 17. |
| 3 | "Soak" | 4.00 | 344 | 16.93 | 11.75 ± 1.4 | 30.0 | 1.0 |
| 4 | Alumina* | 4.00 | 216 | 10.95 | 10.95 ... | nil | nil |

Data averaged from quadruplicate determinations at 30, 40, 50 and 60 min.
*Fisher neutral alumina, 80/200 mesh, activated.

TABLE 2
"Paste" vs. "Soak" Catalyst Preparations

| Run | Catalyst charge | | Contact time millisec | Initial concn micrograms/lit | Final concn micrograms/lit | | Percent Ozone Removed | Pseudo-1st order k |
|---|---|---|---|---|---|---|---|---|
| 5 | "Paste" (Fisher) | 3.00 g alumina | 298 | 14.00 | 30 min: | 0.02 | 99.5 | 22. |
|   |   |   |   |   | 60 min: | 0.02 | 99.5 | 22. |
|   |   |   |   |   | 90 min: | 0.02 | 99.5 | 22. |
|   |   |   |   |   | 120 min: | 0.02 | 99.5 | 22. |
| 6 | "Paste" (Alcoa) | 4.00 alumina | 303 | 18.75 | 30 min: | 0.10 | 99+ | 17. |
|   |   |   |   | 19.34 | 60 min: | 5.26 | 73 | 4.2 |
|   |   |   |   | 19.93 | 90 min: | 8.43 | 58 | 2.8 |
|   |   |   |   | 20.52 | 120 min: | 8.97 | 56 | 2.7 |
| 7 | "Soak" (Alcoa) | 4.00 alumina | 359 | 17.09 | 30 min: | 4.10 | 76 | 3.8 |
|   |   |   |   |   | 60 min: | 9.52 | 44 | 1.6 |
|   |   |   |   |   | 90 min: | 11.00 | 36 | 1.3 |
|   |   |   |   |   | 120 min: | 12.16 | 29 | 1.0 |
| 8 | "Soak" (Fisher) | 3.00 alumina | 293 | 26.89 | 30 min: | 9.68 | 64 | 3.4 |
|   |   |   |   | 26.46 | 60 min: | 12.17 | 54 | 2.6 |
|   |   |   |   | 26.03 | 90 min: | 13.00 | 50 | 2.4 |
|   |   |   |   | 25.60 | 120 min: | 14.53 | 43 | 1.9 |

One difference between "soak" and "paste" preparations appears to be that the alumina structures are immersed in water solution for up to 24 hours in the former case, while the alumina is only superficially moistened and immediately air-dried in the latter case. Whatever surface physical/chemical changes may take place when alumina is immersed in aqueous solutions, these happen more in "soak" catalysts and less in "paste" catalysts. A series of catalysts was prepared using the "soak" technique but varying soak time from 24 hours down to less than half an hour, to determine the effect of this variable. Table 3 shows a series of two-hours runs using catalysts of the above type for which soak times vary from 15 minutes to 1440 minutes (24 hours). Contact times for these tests were 0.28-0.29 seconds, with ozone concentrations near 20 ng/cc. The data in Table 3 show percent ozone removed and effective first-order rate constant (in $sec^{-1}$) after 30, 60, 90 and 120 minutes' running time, with influent ozone concentrations of about 20 micrograms/liter, all at ambient temperature.

While an illustrative method embodying the present invention has been described in detail, it should be understood that the nature of scope of the invention is limited only by the scope and extent of the appended claims.

TABLE 3

| | | | \multicolumn{8}{c|}{Effect of Soak Time Upon Catalyst Activity Towards Ozone} |
|---|---|---|---|---|---|---|---|---|---|---|
| | Soak time | Contact time | \multicolumn{2}{c|}{30 minutes} | \multicolumn{2}{c|}{60 minutes} | \multicolumn{2}{c|}{90 minutes} | \multicolumn{2}{c|}{120 minutes} |
| Run | (minutes) | millisec | % rem. | k | % rem. | k | % rem. | k | % rem. | k |
| 9 | 15 | 283 | 99+ | 19. | 88 | 7.5 | 79 | 5.4 | 79 | 5.4 |
| 10 | 30 | 275 | 99+ | 19. | 90 | 8.3 | 82 | 6.4 | 74 | 5.3 |
| 11 | 60 | 273 | 97 | 12. | 84 | 6.7 | 77 | 5.4 | 71 | 4.7 |
| 12 | 120 | 291 | 99+ | 20. | 93 | 9.2 | 80 | 5.5 | 73 | 4.4 |
| 13 | 240 | 293 | 99+ | 18. | 81 | 5.6 | 77 | 5.0 | 68 | 3.9 |
| 14 | 480 | 294 | 96 | 11. | 97 | 6.8 | 80 | 5.3 | 74 | 4.4 |
| 15 | 1440 | 293 | 64 | 3.4 | 54 | 2.6 | 50 | 2.4 | 43 | 1.9 |

I claim:

1. The method of removing ozone from dilute concentrations thereof in air comprising contacting the ozone and air mixture with a catalyst, comprising a palladium (II) salt and a copper (II) salt on a substrate, at a temperature in the range of about $-20°$ C. to about 85° C. to decompose the ozone.

2. The method of removing ozone from dilute concentrations thereof in air comprising contacting the ozone and air mixture with a catalyst, comprising a palladium (II) salt and a copper (II) salt on a particular substrate, said catalyst being formed by mixing a paste of the substrate and a solution of the palladium (II) salt and copper (II) salt and drying said paste to provide a palladium (II) and copper (II) salt catalyst for contact with the ozone and air mixture at a temperature in the range of about $-20°$ C. to about 85° C. to decompose the ozone.

3. The method defined in claim 2 wherein the palladium (II) salt is present in amounts up to about 0.08 gram-moles/liter of impregnating solution.

4. The method defined in claim 2 wherein the solution of palladium (II) salt and copper (II) salt includes a nickel (II) salt and the combined palladium (II) salt and nickel (II) salt are present in the amount of 0.080 gram-moles/liter of impregnating solution and the molar ratio of palladium (II) salt to nickel (II) salt is at least 1 to 7.

5. The method of removing ozone from dilute concentrations thereof in air comprising contacting the ozone and air mixture with a dry catalyst, comprising a palladium (II) salt and a copper (II) salt on a substrate, said catalyst being formed by contacting the substrate with a solution of the palladium (II) salt in an amount sufficient to wet all particles of the substrate for a soak period of time less than about 4 hours, and thereafter removing any excess solution and drying the moist substrate and activating said catalyst by heating at a temperature of about 200° C., to provide a catalyst for contact with the ozone and air mixture, at a temperature of between about $-20°$ C. and about 85° C. to decompose the ozone.

6. The method as defined in claim 5 wherein the soak period is in the range of about ½ hour to about 2 hours.

7. The method as defined in claim 5 wherein the soak period is about ½ hour.

8. The method defined in claim 1 wherein said salts are halides.

9. The method defined in claim 1 wherein said salts are chlorides.

10. The method defined in claim 1 where said palladium (II) salt is a chloride and said copper (II) salt is a mixture of chloride and sulfate.

11. The method of claim 4 wherein said palladium (II) salt is a chloride, said nickel (II) salt is a chloride and said copper (II) salt is a mixture of chloride and sulfate.

* * * * *